April 12, 1927.
A. L. DUNNAGAN
1,624,321
INSECT DESTROYER
Filed Sept. 1, 1925
2 Sheets-Sheet 1
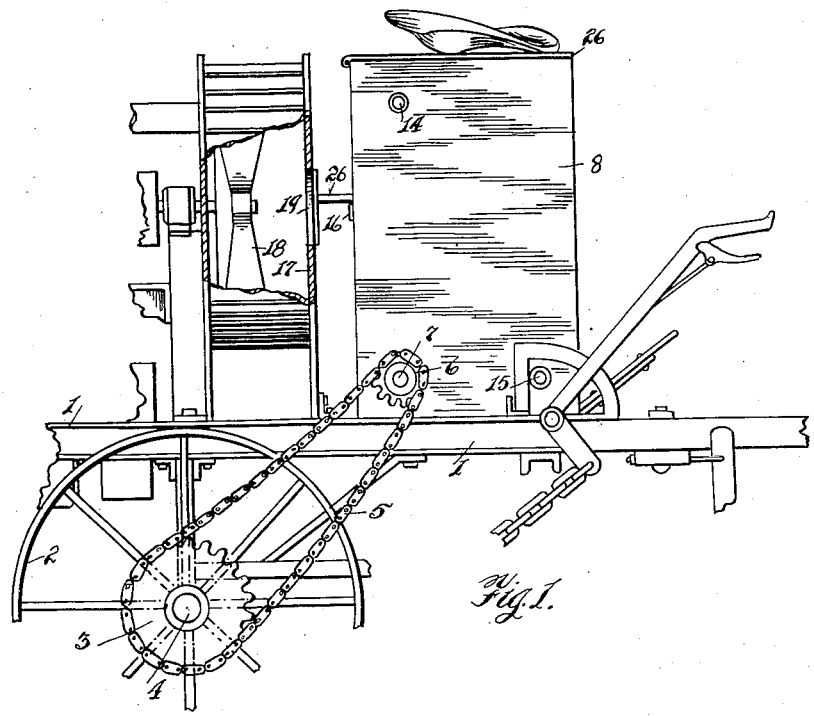
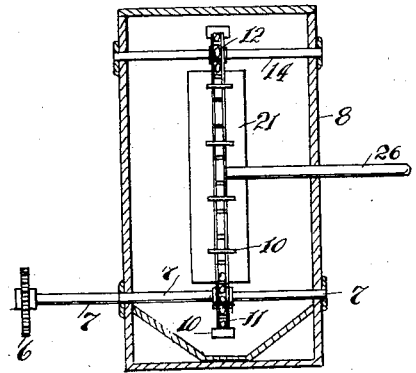
Albert L. Dunnagan
INVENTOR.
BY
ATTORNEY.

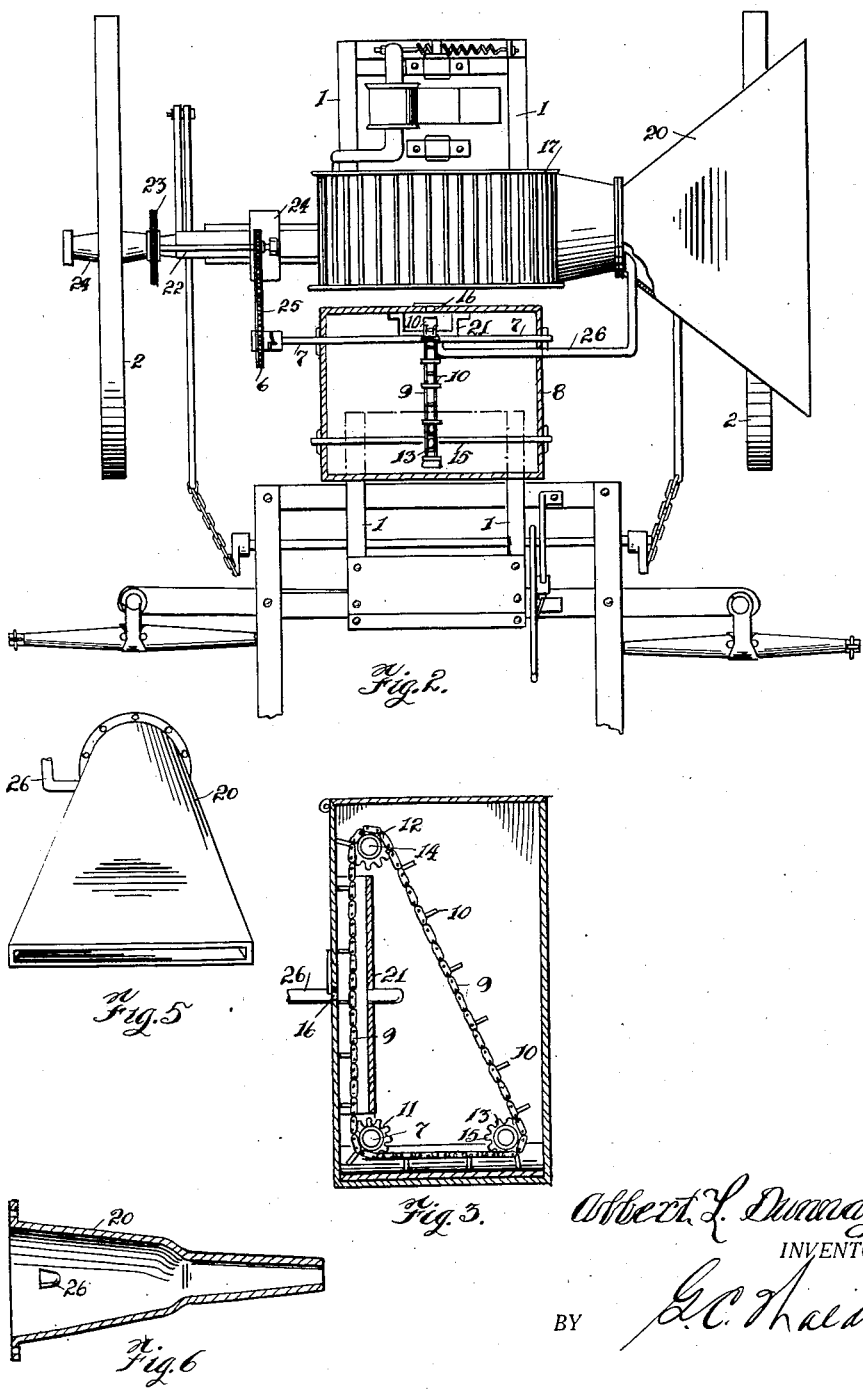

Patented Apr. 12, 1927.

1,624,321

UNITED STATES PATENT OFFICE.

ALBERT L. DUNNAGAN, OF WACO, TEXAS, ASSIGNOR TO DAVID D. DEUTSCH, OF NEW YORK, N. Y.

INSECT DESTROYER.

Application filed September 1, 1925. Serial No. 53,782.

This invention relates to a machine especially designed for the purpose of exterminating boll weevils and other destructive insects, and it has particular reference to an attachment for such machines, arranged to distribute insecticide, preferably in the form of powder, over a wide area of vegetation infested with insects, by means of a combined suction and blower arrangement.

The invention has for its primary objects, to provide an attachment of the character designated, by which unusually effective results are attained through thorough distribution of poison, and further, a process by which no harmful results are produced through such distribution of poison, aside from that for which the poison is intended.

Further, the invention has among its objects the provision of certain expediencies whereby to effect its ready attachment to the machine and its removal therefrom, thus to equip the machine for other uses when not employed for the purposes specified.

With the foregoing and other objects and advantages in view, the invention has particular reference to certain novel features of construction and assembly of parts by which the said objects are attained, and which will be fully manifested in the course of the following detail description and illustrated in the accompanying drawings, wherein:

Figure 1 represents a view of the invention in vertical elevation, as the same appears mounted upon a single row machine.

Figure 2 represents a top plan view of a double row machine, upon which the invention is installed, also illustrating the poison container thereon in cross-section.

Figure 3 is a detail side view of the poison container and conveyor, the former being in vertical cross-section.

Figure 5 is a detail view of the discharge spout, and

Figure 6 is a longitudinal sectional view thereof.

In proceeding further in detail, it has been considered sufficient to illustrate only that portion of the machine upon which the invention is installed, as the latter is constructed to function properly irrespective of the character of supporting frame thereof. Therefore, the reference character 1 denotes the channel iron frame of the machine or conveyance for the invention, which frame is supported upon wheels 2.

The machine as mentioned above, being constructed in two forms, single and double row, the invention is required to be slightly modified, that is, in the driving mechanism therefor, in order to be applicable to each form. However, this modified arrangement carries no significance as to the structural advantages of the invention as a whole. The Figure 2 of the drawings represent the invention as applied to the form of machine referred to above as a double row arrangement, in which a jack shaft is substituted for the direct drive as applied in the operation of the invention when mounted upon the single row machine illustrated in Figure 1. Examples of these different modifications will be set forth more fully as the description proceeds.

Referring now to Figure 1 of the drawings, a sprocket 3 is mounted upon the hub 4 of the machine wheel 2, whereby to revolve therewith, and around which a chain 5 is disposed and adapted to revolve a sprocket 6, mounted upon a shaft 7, extending laterally through the poison container 8.

Attention is now directed to Figure 4, likewise Figure 3, in which is illustrated the interior of the poison container in which a chain 9 is situated. Upon this chain small rectangular strips 10 are welded or otherwise suitably affixed, and which will hereinafter be referred to as conveyors. The chain 9 as appearing in these figures, revolves about sprockets 11, 12 and 13, rigidly affixed to the shafts 7, 14 and 15 respectively, the latter being arranged within the container 8 in such a manner as to afford a vertical rise at one end of the container, the advantage of which will be later described.

The container 8 is further equipped with a V shaped bottom, as apparent in Figure 4. This feature permits the contents of the container to at all times converge centrally whereby to be readily caught up by the conveyors 10 and conveyed to the aperture 16 situated approximately at the center of the said vertical rise in the chain 9, whereby to prevent superfluous deposits of poison being left in inaccessible corners of the container.

Adjacent the apertured end of the container 8 is situated a fan housing 17, in which is disposed a suction fan 18, as in Figure 1. This housing is likewise apertured at 19, which aperture is directly in line with that 16 of the container 8, and permits the fan to create a suction through the apertures, thereby to extract deposits of powder elevated by the conveyors 10, through the apertures and into the housing 17, to be expelled through the discharge spout 20, details of which are clearly illustrated in Figures 5 and 6.

Returning to the container 8; the Figures 2, 3 and 4 depict a hood 21, which is situated within the container and through which the chain 9 passes. During the actuation of the fan 18, the suction produced thereby has a tendency to draw greater quantities of powder from the container than is required, therefore, this hood has been devised to limit the suction produced by the fan to only the quantities of powder elevated by the conveyors 10. This hood further permits the container 8 to be filled to capacity with insecticide so as not to affect the aperture 16, and to avoid hindrance to the discharge facilities of the container.

In the double row machine, so called, in view of its dual function when not employed to operate the described invention, it is required to substitute the jack shaft 22, as mentioned in the preamble, for the driving elements employed in the single row machine above described. Upon the end of the said jack shaft, a sprocket and chain mechanism 23 is affixed to engage the hub 24 of the wheel 2 to impart rotation thereto. On the opposite end of the jack shaft, which is secured to a frame clamp 24, a chain and sprocket mechanism 25 is situated, which latter engages the sprocket 6, thereby to rotate the shaft 7, whereupon the action described as being applied to the single row machine is identical.

In operation, the top 26 of the container 8 is removed or thrown back and a quantity of insect poison, usually in powder form is deposited therein and the top closed. A motor (not shown) is put into motion which is adapted to revolve the fan 18. In the present case, the sole purpose of the motor is to impart rotation to the fan in order to create the required suction, and is not employed to propel the machine, the latter being acomplished through the use of mules, horses or other means of conveyance. Rotation of the wheels impart rotation to the chain 9 within the container 8 through the chain 5, the chain 9 forcing its way through the powdered poison, carrying with it, small deposits of the poison upon the conveyors 10. Immediately upon reaching the aperture 16 of the container 8, the fan 18, by reason of its speed of rotation, sucks the poison from the conveyors as it passes the aperture 16, and into the housing 17, as set forth previously, and discharges the same through the discharge spout 20 to be drifted over the field.

As a further aid in expelling the poison from the container 8, a small pipe or tube 26 is inserted into the spout 20 and directed toward the fan 17, while its other end is bent in such a manner as to extend into the container 8 directly behind the aperture 16 therein. Thus, simultaneously with the exhaust of air from the spout 20, a limited amount of air is received by the pipe 26 and utilized as an aid in expelling the powder through the aperture 16.

It should be herein understood that it is not desired that the described invention be limited to the specific disclosure set forth, and that certain minor changes and modifications may be made therein as fall within the meaning and scope of what is herein claimed.

I claim:

1. In an insect destroyer, the combination with a wheeled supporting frame of a poison receptacle mounted on said frame having an aperture therein; of a suction fan spaced from said receptacle having an aperture alined from said first mentioned aperture; of means within said poison receptacle to elevate poison to a level with its aperture, of means to direct exhausted air from said fan behind said aperture and elevating means as an auxiliary poison discharging means, with means for uniformly discharging said poison from said fan after being withdrawn from said receptacle thereby.

2. In an insect destroyer, the combination with a wheeled supporting frame of an apertured receptacle mounted on said frame arranged to carry poison; of means disposed within said receptacle to elevate said poison to a level with said aperture, with means for extracting said poison through said aperture and distributing the same over an area of vegetation.

3. In an insect destroyer, the combination with a wheeled frame of a poison container removably mounted on said frame having an expelling port therein; of a suction fan spaced from said container provided with an aperture alined with said expelling port; a discharge spout integral with said fan; of a pipe mounted in said discharge spout and directed behind said expelling port whereby to convey exhausted air therethrough as an auxiliary poison expelling means.

4. An insect destroyer including in combination with a wheeled supporting frame, a receptacle mounted on said frame having an expelling port therein and arranged to carry poison; means rotatable within said receptacle to elevate said poison to a level with said expelling port; an encased fan spaced from said receptacle and arranged to create a suction whereby to extract poison from said elevating means; a discharge spout integral with said fan, and a tube disposed within said spout and directed rearwardly of said expelling port adapted to convey exhausted air from said discharge spout therethrough as an auxiliary poison expelling means.

5. An insect destroyer including a receptacle for containing poison having an expelling port therein, an endless chain rotatable on shafts laterally disposed within said receptacle, said chain carrying spaced conveyors whereby to elevate said poison to a level with said expelling port, and suction means spaced from said expelling aperture arranged to extract limited quantities of poison from said conveyors and distribute the same.

6. An insect destroyer having a suction fan and a discharge spout integral therewith, and an apertured receptacle spaced from said fan provided with means for elevating quantities of poison to be extracted through said aperture by said fan and distributed thereby.

7. An insect exterminating apparatus having a suction fan with a discharge spout integral therewith, including an apertured poison receptacle mounted adjacent said fan, means within said receptacle to elevate said poison past said aperture to be extracted and distributed by said fan, and a hood enclosing said aperture and poison elevating means to prevent excess discharges of poison by said fan.

8. An insect exterminating apparatus having a suction fan with a discharge spout integral therewith, including an apertured poison receptacle mounted adjacent said fan, and means to convey exhausted air from said discharge spout and direct it behind said aperture to aid in expelling said poison therethrough.

In testimony whereof I affix my signature.

ALBERT L. DUNNAGAN.